US011263858B2

(12) United States Patent
Nagai et al.

(10) Patent No.: US 11,263,858 B2
(45) Date of Patent: Mar. 1, 2022

(54) CASH PROCESSING SYSTEM, CASH PROCESSING METHOD, PORTABLE TERMINAL AND CASH PROCESSING MACHINE

(71) Applicant: GLORY LTD., Hyogo (JP)

(72) Inventors: Yuki Nagai, Hyogo (JP); Naoki Oka, Hyogo (JP); Nobumichi Wakabayashi, Hyogo (JP)

(73) Assignee: GLORY LTD., Hyogo (JP)

( * ) Notice: Subject to any disclaimer, the term of this patent is extended or adjusted under 35 U.S.C. 154(b) by 150 days.

(21) Appl. No.: 16/313,121

(22) PCT Filed: Jun. 30, 2017

(86) PCT No.: PCT/JP2017/024122
§ 371 (c)(1),
(2) Date: Dec. 24, 2018

(87) PCT Pub. No.: WO2018/003969
PCT Pub. Date: Jan. 4, 2018

(65) Prior Publication Data
US 2019/0197813 A1      Jun. 27, 2019

(30) Foreign Application Priority Data

Jun. 30, 2016   (JP) .............................. JP2016-130500

(51) Int. Cl.
*G07D 11/60* (2019.01)
*G07D 11/14* (2019.01)
*G07D 9/00* (2006.01)
*G06Q 40/02* (2012.01)
(Continued)

(52) U.S. Cl.
CPC ......... *G07D 11/60* (2019.01); *G06Q 20/1085* (2013.01); *G06Q 40/02* (2013.01);
(Continued)

(58) Field of Classification Search
USPC ........................................................ 705/35
See application file for complete search history.

(56) References Cited

U.S. PATENT DOCUMENTS

| 5,451,757 A | * | 9/1995 | Heath, Jr. | ................ | G07C 9/33 |
| | | | | | 340/5.4 |
| 5,488,358 A | * | 1/1996 | Hamilton | ................ | G07F 19/20 |
| | | | | | 340/5.26 |

(Continued)

FOREIGN PATENT DOCUMENTS

| CN | 101443807 A | 5/2009 |
| EP | 2819106 | 12/2014 |

(Continued)

OTHER PUBLICATIONS

N. R. Kisore and S. Sagi, "A secure SMS protocol for implementing digital cash system," 2015 International Conference on Advances in Computing, Communications and Informatics (ICACCI), 2015, pp. 1883-1892, doi: 10.1109/ICACCI.2015.7275893. (Digital Cash). (Year: 2015).*

(Continued)

*Primary Examiner* — Chikaodinaka Ojiaku
(74) *Attorney, Agent, or Firm* — Greenblum & Bernstein, P.L.C.

(57) ABSTRACT

A cash processing system capable of preventing erroneous operations by an operator during cash transfer processing and enabling the cash transfer to be executed efficiently. This system comprises a first cash processing machine for performing an outgoing cash transfer, a second cash processing machine for performing an incoming cash transfer, and a portable terminal. The portable terminal is equipped with a display unit, an operation unit for receiving input of cash transfer information, including cash information, and a communication processing unit. Upon receiving outgoing cash transfer information included in the cash transfer (Continued)

information from the portable terminal, the first cash processing machine pays out cash based on the outgoing cash transfer information. Upon receiving incoming cash transfer information included in the cash transfer information from the portable terminal, the second cash processing machine receives cash based on the incoming cash transfer information.

11 Claims, 9 Drawing Sheets

(51) Int. Cl.
  G07D 11/50 (2019.01)
  G07D 11/16 (2019.01)
  G06Q 20/10 (2012.01)
(52) U.S. Cl.
  CPC .............. *G07D 9/00* (2013.01); *G07D 11/14* (2019.01); *G07D 11/16* (2019.01); *G07D 11/50* (2019.01); *G07D 2211/00* (2013.01)

(56) References Cited

U.S. PATENT DOCUMENTS

| | | | | |
|---|---|---|---|---|
| 5,541,581 A * | 7/1996 | Trent | .................... | G07F 19/205 340/5.55 |
| 5,873,276 A * | 2/1999 | Dawson | ............. | G07C 9/00912 70/277 |
| 5,905,810 A * | 5/1999 | Jones | ....................... | G07D 7/20 382/135 |
| 6,128,402 A * | 10/2000 | Jones | ..................... | G07D 11/50 382/135 |
| 6,230,928 B1 * | 5/2001 | Hanna | ..................... | G07D 1/00 221/13 |
| 6,378,770 B1 * | 4/2002 | Clark | .................... | G07D 11/245 235/379 |
| 6,523,742 B1 * | 2/2003 | Awatsu | .............. | G06Q 20/1085 235/379 |
| 6,540,136 B1 * | 4/2003 | Ross | ....................... | G07D 11/50 235/379 |
| 6,948,655 B2 * | 9/2005 | Washington | ....... | G06Q 20/1085 235/379 |
| 6,983,836 B2 * | 1/2006 | Adams | .................... | G07D 3/00 194/302 |
| 7,000,778 B2 * | 2/2006 | Omori | .................... | G07F 19/20 209/534 |
| 7,025,255 B1 * | 4/2006 | Drummond | ............. | G07F 19/20 235/379 |
| 7,185,749 B2 * | 3/2007 | Armanini | .............. | G07D 11/40 194/302 |
| 7,362,891 B2 * | 4/2008 | Jones | ..................... | G06Q 20/10 382/135 |
| 7,850,076 B1 * | 12/2010 | Dorenbaum | .......... | G06Q 40/02 235/381 |
| 7,967,192 B1 * | 6/2011 | Meek | .................... | G06Q 20/108 235/379 |
| 7,980,462 B1 * | 7/2011 | Graef | ..................... | G06Q 30/02 235/379 |
| 8,600,842 B1 | 12/2013 | Sanders et al. | | |
| 9,311,671 B2 * | 4/2016 | Folk | ........................ | G06Q 20/10 |
| 9,311,674 B2 * | 4/2016 | Angus | ................... | G07D 11/22 |
| 9,779,588 B2 * | 10/2017 | Angus | ................... | G06Q 10/08 |
| 9,978,197 B2 * | 5/2018 | Kobayashi | ............. | G07D 11/60 |
| 10,217,084 B2 * | 2/2019 | Cantley | .............. | G06K 7/10762 |
| 10,275,972 B2 * | 4/2019 | Cantley | ................. | G07F 19/203 |
| 10,475,295 B2 * | 11/2019 | Angus | ................... | G06Q 20/18 |
| 10,515,518 B2 * | 12/2019 | Cantley | ................ | G06Q 10/087 |
| 10,540,858 B2 * | 1/2020 | Angus | ................... | G07F 19/204 |
| 2001/0020638 A1 * | 9/2001 | Uematsu | ............... | G07F 19/202 235/379 |
| 2001/0054643 A1 * | 12/2001 | Siemens | .............. | G07D 11/009 235/379 |
| 2002/0017556 A1 * | 2/2002 | Putman | ................... | G07F 19/20 235/379 |
| 2003/0040959 A1 * | 2/2003 | Fei | .......................... | G06Q 20/10 705/14.4 |
| 2003/0083969 A1 * | 5/2003 | Uchiyama | ............. | G07F 19/202 705/35 |
| 2004/0122771 A1 | 6/2004 | Celi, Jr. et al. | | |
| 2004/0217163 A1 * | 11/2004 | Savage | ................. | G07F 19/211 235/380 |
| 2004/0260650 A1 * | 12/2004 | Nagaya | ................... | G07D 11/36 705/43 |
| 2005/0017066 A1 * | 1/2005 | Carter | ............... | G06Q 10/06398 235/375 |
| 2005/0060233 A1 * | 3/2005 | Bonalle | ..................... | G07C 9/29 705/16 |
| 2005/0080731 A1 * | 4/2005 | Dnyaneshwar | ....... | G07F 19/203 705/39 |
| 2005/0096986 A1 * | 5/2005 | Taylor | .................... | G06Q 40/02 705/16 |
| 2005/0108164 A1 * | 5/2005 | Salafia, III | ........... | G06Q 20/047 705/42 |
| 2005/0109832 A1 * | 5/2005 | Izawa | ..................... | G07F 19/20 235/379 |
| 2006/0022032 A1 * | 2/2006 | Fillinger | ................. | G07F 19/20 235/379 |
| 2006/0065717 A1 * | 3/2006 | Hurwitz | ............... | G06Q 20/023 235/381 |
| 2007/0045395 A1 * | 3/2007 | Corona | .................. | G06Q 40/00 235/379 |
| 2007/0063016 A1 * | 3/2007 | Myatt | .................... | G06Q 40/00 235/379 |
| 2008/0149706 A1 * | 6/2008 | Brown | ................... | G06Q 40/12 235/379 |
| 2009/0043663 A1 * | 2/2009 | Prater | ..................... | G06Q 40/12 705/16 |
| 2009/0222362 A1 * | 9/2009 | Stood | ..................... | G06Q 40/00 705/30 |
| 2010/0065623 A1 * | 3/2010 | Sauter | .................. | G07D 11/135 232/1 D |
| 2011/0270746 A1 * | 11/2011 | Kim | ..................... | G06Q 20/381 705/39 |
| 2013/0054468 A1 * | 2/2013 | Fuentes | ................ | G06Q 20/108 705/64 |
| 2014/0166745 A1 * | 6/2014 | Graef | ..................... | G07F 19/202 235/379 |
| 2014/0339301 A1 * | 11/2014 | Angus | ..................... | G07D 11/30 235/379 |
| 2015/0178670 A1 * | 6/2015 | Angus | .................... | G06Q 10/08 705/28 |
| 2015/0178693 A1 * | 6/2015 | Solis | ................. | G06Q 20/027 705/30 |
| 2015/0379485 A1 * | 12/2015 | Danielak | ............ | G06Q 20/108 705/36 R |
| 2016/0086143 A1 * | 3/2016 | Hao | ................... | G06Q 20/1085 705/43 |
| 2016/0098904 A1 * | 4/2016 | Choudhury | ............ | G06Q 40/02 705/43 |
| 2017/0039819 A1 * | 2/2017 | Angus | ..................... | G06Q 20/18 |
| 2017/0039820 A1 * | 2/2017 | Angus | ................... | G07F 19/204 |
| 2018/0324505 A1 * | 11/2018 | Zheng | ..................... | H04J 3/085 |
| 2019/0140759 A1 * | 5/2019 | Su | .............................. | H04J 3/14 |

FOREIGN PATENT DOCUMENTS

| | | |
|---|---|---|
| JP | 3167378 B | 3/2001 |
| JP | 2012-178023 | 9/2012 |
| JP | 2015-38677 A | 2/2015 |
| JP | 2016-62127 A | 4/2016 |
| JP | 2016-91485 A | 5/2016 |

OTHER PUBLICATIONS

European Extended Search Report in counterpart European Application No. 17820323.8, dated Jan. 21, 2020.

(56) References Cited

OTHER PUBLICATIONS

International Search Report issued with respect to Patent Application No. PCT/JP2017/024122, dated Aug. 22, 2017.
International Preliminary Report on Patentability issued with respect to Patent Application No. PCT/JP2017/024122, dated Jan. 1, 2019.

* cited by examiner

| SERIAL NUMBER | MOVING MONEY SOURCE APPARATUS | MOVING MONEY DESTINATION APPARATUS | MOVING MONEY AMOUNT | NUMBER ON EACH DENOMINATION | OPERATOR | GIVING MONEY DATE AND TIME | ACCEPTING MONEY DATE AND TIME | PROCESS PROGRESS |
|---|---|---|---|---|---|---|---|---|
| 001 | CASHER | MONEY CHANGER | 1,000,000 | TEN THOUSAND NOTE x 100 | 12345 | 2016/6/22 10:00 | 2016/6/22 10:10 | COMPLETED |
| 002 | CASHER | TELLER MACHINE | 2,000,000 | TEN THOUSAND NOTE x 200 | 12345 | | | NOT YET |
| | | | | | | | | |

FIG. 4

CASH PROCESSING SYSTEM, CASH PROCESSING METHOD, PORTABLE TERMINAL AND CASH PROCESSING MACHINE

TECHNICAL FIELD

The present invention relates to a cash processing system installed in a store (a branch, an office, etc.) of a financial institution, such as a bank or a post office, a cash processing method, a portable terminal, and a cash processing machine, and in particular, to a technique suitable for a moving money process.

BACKGROUND ART

Typically, a cash processing system is installed in a store of a financial institution. Such a system includes a plurality of cash processing machines: for example a casher that manages cash in the store, automatic tellers machines (ATMs) that allow customers to operate these machines by themselves to input and output cash, teller machines (TMs) that allow tellers to operate teller terminals to accept and give cash, and money changers that automatically change money.

In such a cash processing system, cash is moved between two machines, that is, a moving money process is performed. For example, a process of removing cash from a casher (dispensing money) and of replenishing another cash processing machine, such as a money changer, with the cash (accepting money) is performed.

The moving money process by the cash processing system is typically performed as follows. First, an operator inputs moving money information through an operation panel into a cash processing machine serving as a moving money source (hereinafter called "moving money source apparatus"). The moving money information includes a moving money amount, the number on each denomination, information pertaining to the operator, and information pertaining to the cash processing machine serving as the moving money destination (hereinafter called "moving money destination apparatus"). After a dispensing money process by the operator is permitted at the moving money source apparatus, the input amount of cash can be dispensed. The moving money source apparatus dispenses the cash, and issues and outputs a moving money voucher on which the moving money information is written. The operator carries the cash and moves to the moving money destination apparatus, and inputs the moving money information through the operation panel of the moving money destination apparatus with reference to the moving money voucher. After an accepting money process by the operator is permitted at the moving money destination apparatus, cash can be input. Accordingly, the operator replenishes the apparatus with the cash. In the moving money destination apparatus, the inventory amount of the apparatus is updated on the basis of the input moving money information or of a result of counted replenished cash.

PTL 1 discloses a moving money processing system that transfers moving money data generated by a casher apparatus (moving money source apparatus) to a teller processing apparatus (moving money destination apparatus) and allows the teller processing apparatus to perform the moving money process based on the transferred moving money data. This moving money processing system negates the need of the voucher issuance and double input operations accompanying the moving money process. Consequently, the moving money process is simplified.

CITATION LIST

Patent Literature

PTL 1

SUMMARY OF INVENTION

Technical Problem

However, in the moving money processing system described in PTL 1, at least the moving money source apparatus is required to identify the operator (for example, insertion of an ID card) and perform an operation of inputting the moving money information, and the moving money destination apparatus is required to identify the operator and perform an operation of obtaining the moving money information. That is, in the moving money process, operation is required on each of the moving money source apparatus and the moving money destination apparatus. Each cash processing machine has a process menu on an apparatus-by-apparatus basis. An item pertaining to the moving money process is prepared as one item in the process menu. Accordingly, this fact serves as a factor of inducing an erroneous operation and reducing the moving money process efficiency. In particular, when moving money processes that need the same cash processing machine (e.g., a casher) occur at the same time, any prolonged input operation can significantly reduce the moving money process efficiency because one operator occupies this cash processing machine.

An object of the present invention is to provide a cash processing system, a cash processing method, a portable terminal and a cash processing machine that can prevent an erroneous operation by the operator in the moving money process and efficiently execute the moving money process.

Solution to Problem

An cash processing system according to one aspect of the present invention includes a first cash processing machine operating as a money dispenser, a second cash processing machine operating as a money acceptor, and a portable terminal,
in which the portable terminal includes:
an operation acceptor operable to receive an input of moving money information including cash information; and
a communication processing section that transmits and receives information to and from the first cash processing machine and the second cash processing machine, and
upon receipt of money dispensing information included in the moving money information from the portable terminal, the first cash processing machine dispenses cash based on the money dispensing information, and
upon receipt of money accepting information included in the moving money information from the portable terminal, the second cash processing machine accepts cash based on the money accepting information.

A cash processing method according to one aspect of the present invention is a method in a cash processing system including a first cash processing machine operating as a money dispenser, a second cash processing machine operating as a money acceptor, and a portable terminal, the cash processing method including:

accepting, by the portable terminal, an input of moving money information including cash information;

transmitting, by the portable terminal, the moving money information to the first cash processing machine;

dispensing, by the first cash processing machine, cash based on money dispensing information included in the moving money information, upon receipt of the money dispensing information;

transmitting, by the portable terminal, the moving money information to the second cash processing machine; and accepting, by the second cash processing machine, cash based on money accepting information included in the moving money information, upon receipt of the money accepting information.

A portable terminal according to one aspect of the present invention is a terminal for use when a moving money process is performed in a cash processing system, the cash processing system including a first cash processing machine operating as a money dispenser, and a second cash processing machine operating as a money acceptor, the portable terminal including:

an operation acceptor operable to receive an input of moving money information including cash information;

a communication processing section that transmits and receives information to and from the first cash processing machine and the second cash processing machine; and a moving money instruction section that transmits the moving money information to the first cash processing machine and instructs the first cash processing machine to dispense cash based on money dispensing information included in the moving money information when communication is established with the first cash processing machine, and that transmits the moving money information to the second cash processing machine and instructs the second cash processing machine to accept cash based on money accepting information included in the moving money information when communication is established with the second cash processing machine.

A cash processing machine according to one aspect of the present invention includes:

a communication processing section that receives moving money information including cash information, the moving money information having been accepted by an operation unit of a portable terminal as an input; and a money accepting and dispensing section that dispenses or accepts cash based on the moving money information upon receipt of the moving money information.

Advantageous Effects of Invention

The present invention can prevent the erroneous operation by the operator in the moving money process, and efficiently execute the moving money process.

BRIEF DESCRIPTION OF DRAWINGS

FIG. 4 illustrates an example of a data structure of moving money information;

DESCRIPTION OF EMBODIMENTS

Embodiments of the present invention are hereinafter described in detail with reference to the drawings.

Figure 1:
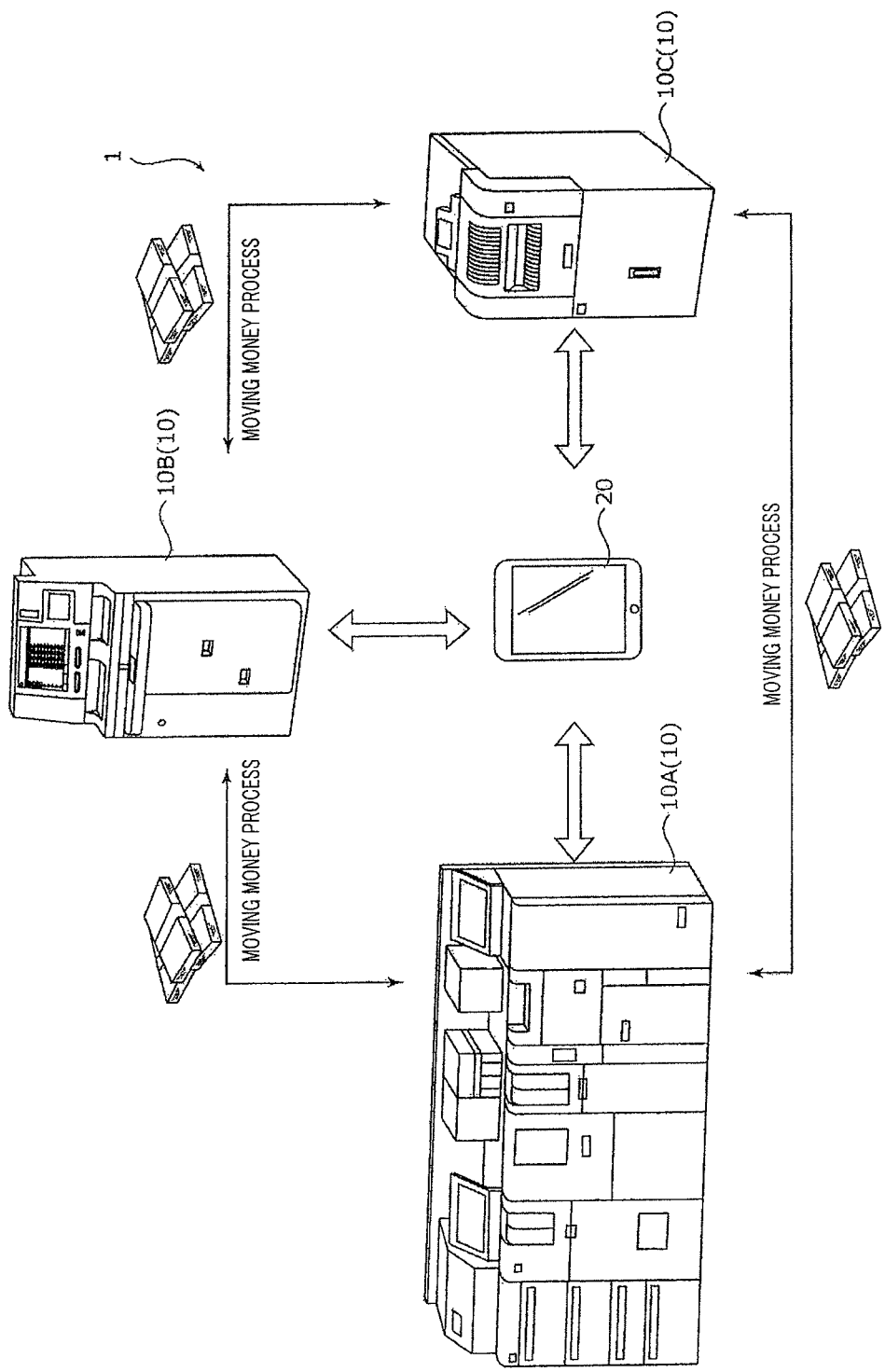
FIG. 1 illustrates a cash processing system according to an embodiment.

FIG. 1 illustrates cash processing system 1 according to one embodiment of the present invention. Cash processing system 1 includes a plurality of cash processing machines 10 installed in the same store of a financial institution, and a plurality of portable terminals 20. Cash processing machines 10 include, for example, casher 10A, money changer 10B, banknote and coin teller machine 10C, and automatic tellers machine (ATM; not illustrated). Portable terminal 20 is a general-purpose tablet terminal held by a clerk of a financial institution (an operator allowed for a moving money process operation). An application program for performing the moving money process (moving money process program 222; see FIG. 3) is installed in this terminal.

Cash processing system 1 may include at least one portable terminal 20. However, to execute the moving money process efficiently, it is preferred that this system should include a plurality of portable terminals 20. For example, each operator uses a single portable terminal 20 in a dedicated manner.

In cash processing system 1, the moving money process is performed between two cash processing machines 10 (e.g., casher 10A and money changer 10B). Hereinafter, cash processing machine 10 that performs dispensing money is called "moving money source apparatus 10", cash processing machine 10 that performs accepting money is called "moving money destination apparatus 10", and moving money source apparatus 10 and moving money destination apparatus 10 are collectively called "cooperating apparatuses 10". Cash processing machine 10 can serve as a cooperating apparatus irrespective of the type of the machine.

Figure 2:
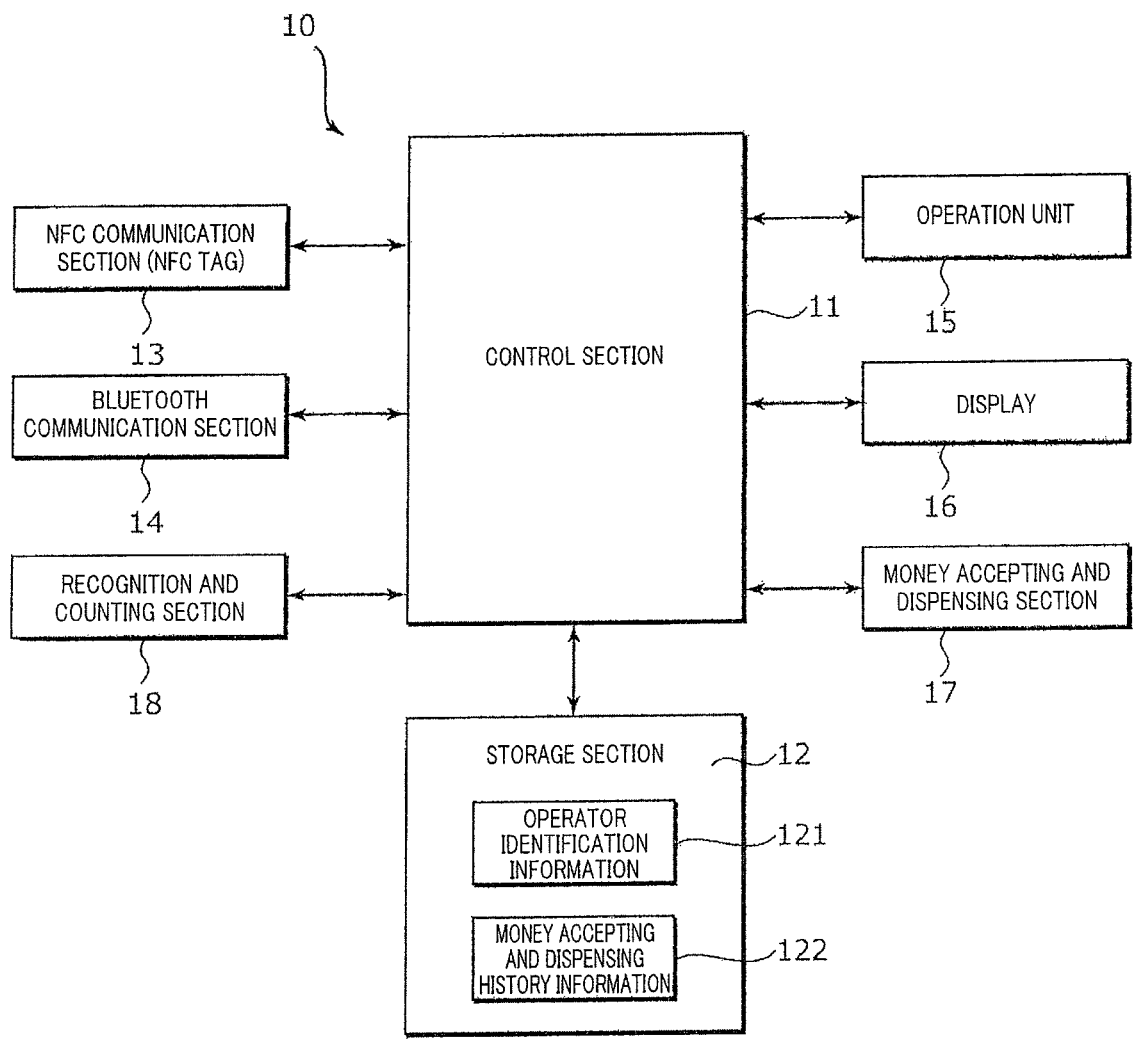
FIG. 2 illustrates a configuration of a cash processing machine.

FIG. 2 illustrates a configuration of cash processing machine 10. As illustrated in FIG. 2, cash processing machine 10 includes control section 11, storage section 12, NFC communication section 13, Bluetooth communication section 14, operation unit 15, display 16, money accepting and dispensing section 17, and recognition and counting section 18.

Control section 11 includes a CPU (Central Processing Unit), a ROM (Read Only Memory) and a RAM (Random Access Memory) (all of them are not illustrated). The CPU reads the program according to the processing content from, for example, the ROM or storage section 12, deploys the program on the RAM, and executes the deployed program to control the operation of each block of cash processing machine 10 in a centralized manner.

Storage section 12 is an auxiliary storage device, for example, an HDD (Hard Disk Drive) or an SSD (Solid State Drive). Storage section 12 stores operator identification information 121 for identifying the operator of cash processing machine 10, money accepting and dispensing history information 122 for managing the types and amounts of accepted and dispensed money and the like.

NFC communication section 13 is an interface for communication with portable terminal 20 according to NFC (Near Field Communication). NFC communication section 13 is made up of an NFC module and the like, and operates on the basis of instructions from control section 11. NFC communication section 13 establishes NFC communication with portable terminal 20, for example, and transmits and receives setting information for establishing communication according to Bluetooth®. NFC communication section 13 is, for example, an NFC tag that includes an IC chip and an antenna.

Bluetooth communication section 14 is an interface for communication with portable terminal 20 according to Bluetooth. Bluetooth communication section 14 is made up of a Bluetooth module and the like, and operates on the basis of instructions from control section 11. Bluetooth communication section 14 transmits and receives moving money information to and from portable terminal 20.

Operation unit 15 includes a pointing device, such as a keyboard through which characters and numerals can be input, and a mouse. Operation unit 15 is used to set operator identification information 121 and the like. Display 16 is a display, such as a liquid crystal display or an organic EL display, and displays information required to dispense and accept cash at cash processing machine 10.

Money accepting and dispensing section 17 is a unit for accepting or dispensing money. For example, in a case of casher 10A, money accepting and dispensing section 17 includes a new series note dispensing section, a bound notes dispensing section, a loose notes accepting and dispensing section, a coin-roll dispensing section, and a loose coins accepting and dispensing section. Recognition and counting section 18 counts accepted money and money to be dispensed, while identifying the money. Certain types of cash processing machines 10 may include no recognition and counting section 18.

Figure 3:
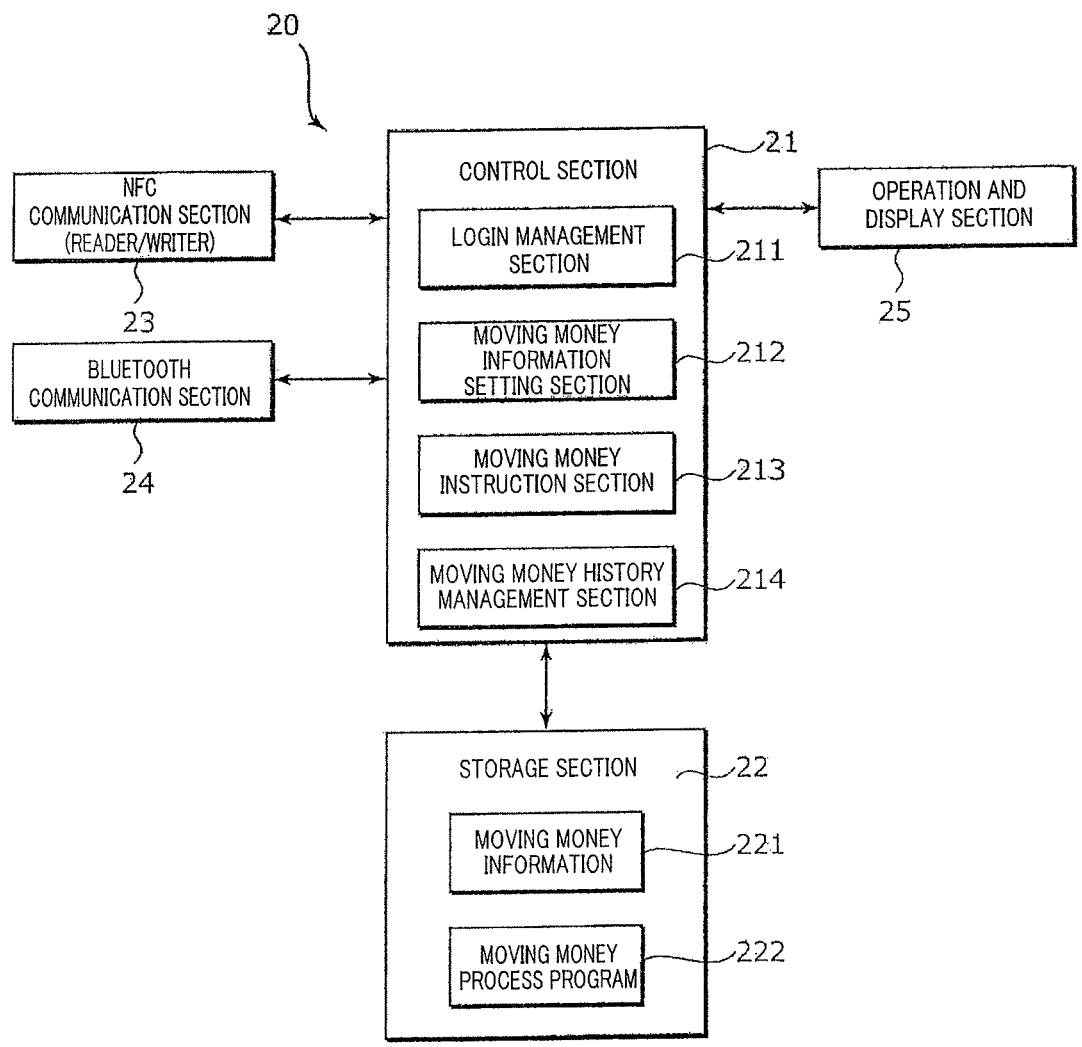
FIG. 3 illustrates a configuration of a portable terminal.

FIG. 3 illustrates a configuration of portable terminal 20. As illustrated in FIG. 3, portable terminal 20 includes control section 21, storage section 22, NFC communication section 23, Bluetooth communication section 24, and operation and display section 25.

Control section 21 includes a CPU, a ROM and a RAM (all of them are not illustrated). The CPU reads the program according to the processing content from, for example, the ROM or storage section 22, deploys the program on the RAM, and executes the deployed program to control the operation of each block of portable terminal 20 in a centralized manner. Control section 21 functions as login management section 211, moving money information setting section 212, moving money instruction section 213, and moving money history management section 214.

Login management section 211 includes recognition information (login IDs and passwords) of operators allowed to use portable terminal 20. Login management section 211 displays a login screen on operation and display section 25 according to activation of portable terminal 20, and performs login identification for the operator on the basis of the recognition information input through the login screen.

Moving money information setting section 212 displays a moving money process screen or the like on operation and display section 25, and stores, in storage section 22, the moving money information input through the moving money process screen. Moving money instruction section 213 displays a predetermined screen on operation and display section 25 at times of dispensing and accepting money to assist the moving money process by the operator. Moving money history management section 214 manages the progress (including completion) of the moving money process being performed using portable terminal 20.

Storage section 22 is an auxiliary storage device, such as an SSD (Solid State Drive). Storage section 22 stores moving money information 221, moving money process program 222 and the like.

FIG. 4 illustrates an example of a data structure of moving money information 221. As illustrated in FIG. 4, a serial number is assigned to each moving money process. Moving money information 221 includes information pertaining to moving money source apparatus 10 (moving money source apparatus information), information pertaining to moving money destination apparatus 10 (moving money destination apparatus information), cash information representing the moving money amount and the number on each denomination, information pertaining to an operator performing the moving money process (operator information), information on the dispensing money date and time, information on the accepting money date and time, and process progress information. In information included in moving money information 221, information used for dispensing money is called "money dispensing information", and information used for accepting money is called "money accepting information".

The moving money source apparatus information, the moving money destination apparatus information, the cash information and the operator information in the moving money information 221 are registered when the moving money information is input before the moving money process. The information on the dispensing money date and time, the information on the accepting money date and time, and the process progress information are appropriately updated according to the progress situation of the moving money process. Information identical to the login ID used for login identification may be set as the operator information. Alternatively, the operator information may be separately set for the moving money process.

In FIG. 4, a moving money process with a serial number of 001 is a moving money process where an operator with an ID of 12345 moves a million yen (100 ten thousand notes) from casher 10A to money changer 10B. The dispensing money date and time and the accepting money date and time are registered, and the moving money process has already been completed. A moving money process with a serial number of 002 is a moving money process where the operator with the ID of 12345 moves two million yen (200 ten thousand notes) from casher 10A to teller machine 10C. Neither the dispensing money date and time nor the accepting money date and time is registered. Consequently, the state is before the dispensing money.

In FIG. 3, NFC communication section 23 is an interface for performing communication with cash processing machine 10 through NFC. NFC communication section 23 is made up of an NFC module and the like, and operates on the basis of instructions from control section 21. NFC communication section 23 establishes NFC communication with cash processing machine 10, for example, and transmits and receives setting information for establishing communication according to Bluetooth. NFC communication section 23 is, for example, an NFC reader/writer that reads information that NFC communication section 13 (the NFC tag) of cash processing machine 10 has, and writes information to the NFC tag.

Bluetooth communication section 24 is an interface for communication with cash processing machine 10 according to Bluetooth. Bluetooth communication section 24 is made up of a Bluetooth module and the like, and operates on the basis of instructions from control section 21. Bluetooth communication section 24 transmits and receives the moving money information to and from cash processing machine 10.

Operation and display section 25 is, for example, made up of a flat panel display with a touch panel being attached thereto. A liquid crystal display, an organic EL display or the like may be used as the flat panel display. Operation and display section 25 displays information, and accepts an operation by the operator. Operation and display section 25 is used for inputting the moving money information, for example.

In this embodiment, during the moving money process, the moving money information is set using portable terminal 20, and the moving money information is transmitted to cooperating apparatus 10, which serves as the moving money process target, using NFC communication and Bluetooth communication. Specifically, the moving money process is performed along the sequence diagram illustrated in FIG. 5.

Figure 5:
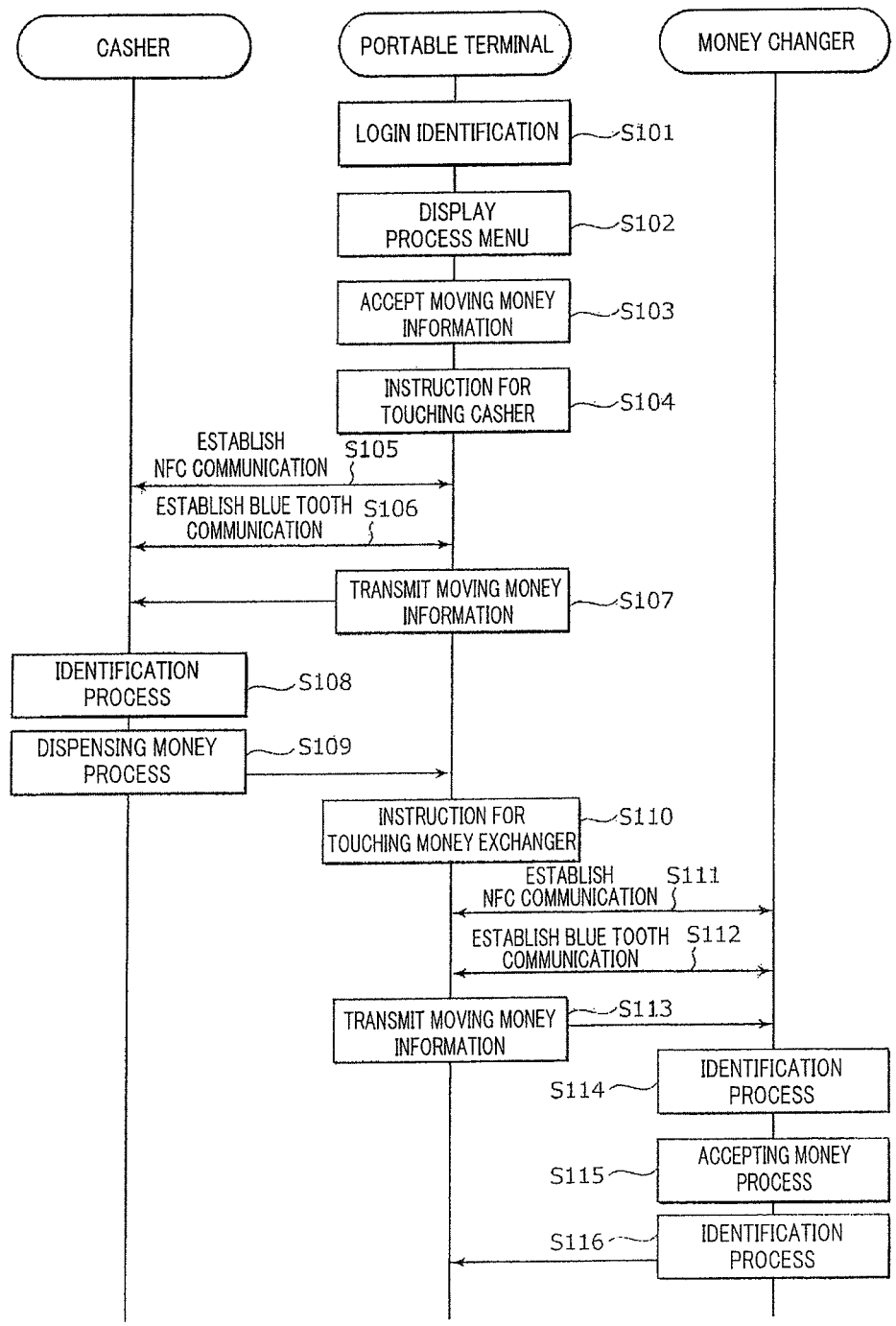
FIG. 5 is a sequence diagram illustrating an example of a moving money process executed in the cash processing system.
Figure 6:
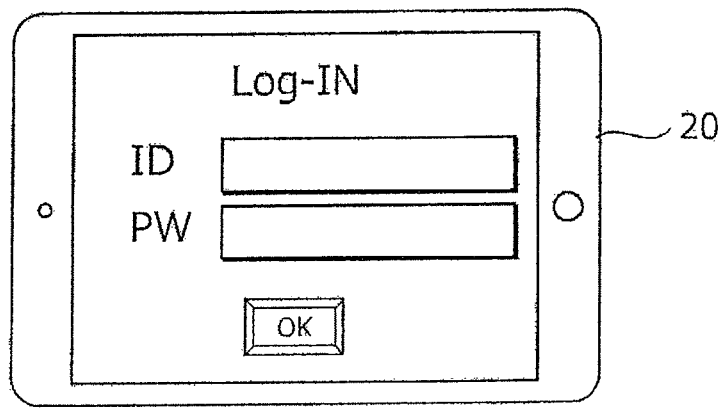
FIG. 6 illustrates a screen example displayed on the portable terminal in the moving money process.

FIG. 5 is a sequence diagram illustrating an example of the moving money process executed in cash processing system 1. FIGS. 6 to 16 each illustrate a screen example displayed on portable terminal 20 in the moving money process. Here, the moving money process in a case of dispensing money from casher 10A and of accepting money at money changer 10B is described.

As illustrated in FIG. 5, in the moving money process, first, the moving money information is set in portable terminal 20. Specifically, in step S101, portable terminal 20 performs login identification for the operator (a process of login management section 211). Accompanied by activation of portable terminal 20, on the login screen (see FIG. 6) displayed on operation and display section 25, the operator performing the moving money process inputs the preset login ID and password. Portable terminal 20 determines whether this portable terminal 20 can be used by the operator or not on the basis of the login ID and password of the operator accepted on the login screen. After the operator is identified as an authentic operator permitted for use, the processing transitions to a process in step S102.

Figure 7:
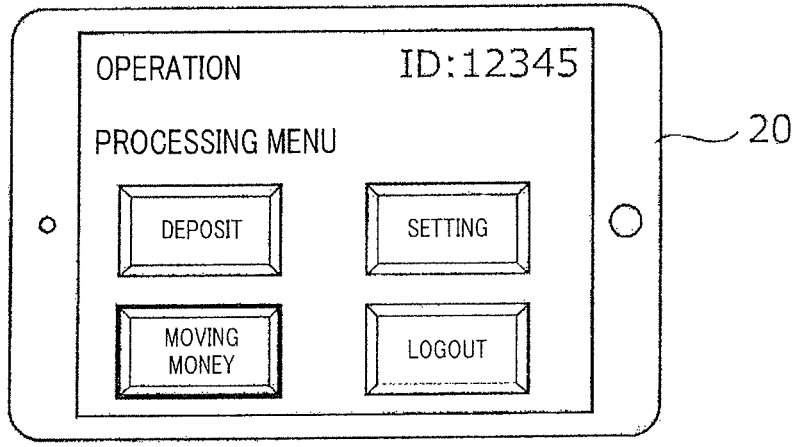
FIG. 7 illustrates a screen example displayed on the portable terminal in the moving money process.

In step S102, portable terminal 20 displays a menu screen for selection of a process to be executed (see FIG. 7). On the process menu illustrated in FIG. 7, not only information (operation ID) on the operator performing the moving money process, but also "Deposit", "Moving money", "Setting" and "Logout" are displayed as processing items executable using portable terminal 20. To perform the moving money process, the operator selects "Moving money" on the process menu. When the moving money process is selected on the menu screen by the operator, the processing transitions to a process in step S103.

In step S103, portable terminal 20 executes moving money process program 222 to display the moving money process screen for inputting moving money information 221 (see FIGS. 8 and 9) and accepts the operator's input of moving money information 221 (a process of moving money information setting section 212).

Figure 8:
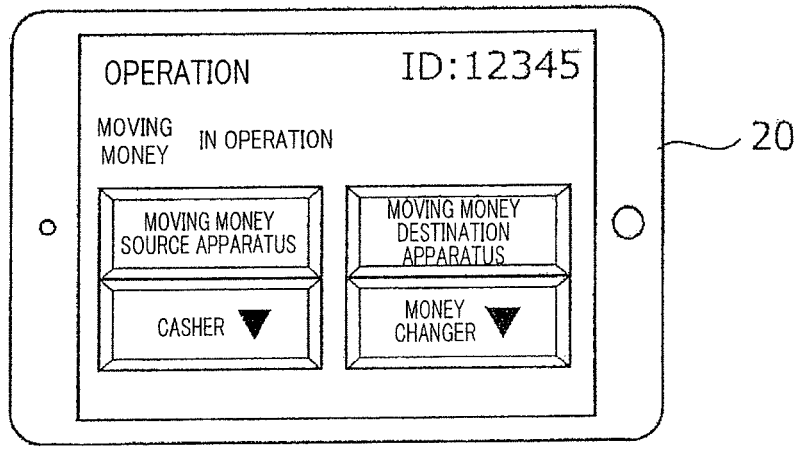
FIG. 8 illustrates a screen example displayed on the portable terminal in the moving money process.

FIG. 8 illustrates an example of the moving money process screen for setting cooperating apparatus 10. On the moving money process screen illustrated in FIG. 8, moving money source apparatus 10 (displayed as "Moving money source apparatus" in FIG. 8) and moving money destination apparatus 10 (displayed as "Moving money destination apparatus" in FIG. 8) are selected from a pull-down menu. In FIG. 8, "Casher" is selected as moving money source apparatus 10, and "Money changer" is selected as moving money destination apparatus 10.

Figure 9:
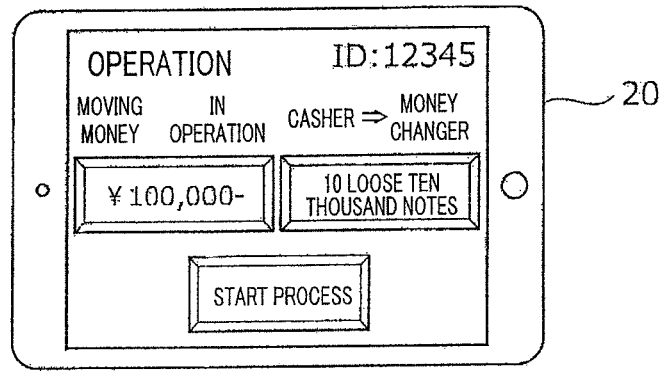
FIG. 9 illustrates a screen example displayed on the portable terminal in the moving money process.

FIG. 9 illustrates an example of the moving money process screen for inputting the cash information. On the moving money process screen illustrated in FIG. 9, "¥100,000" is input as the moving money amount, and "10 loose ten thousand notes" is input as the number on each denomination. An operation of a button for instruction of "Start process" completes the setting of the moving money information, and the processing transitions to the dispensing money process.

Steps S101 to S103 in FIG. 5 complete the setting of the moving money information in portable terminal 20. These processes are performed using portable terminal 20. Consequently, the operator can set the moving money information at the operator's own business space (e.g., a teller window) without going a place where cooperating apparatus 10 is installed. After the setting of the moving money information is completed, the processing transitions to a process in step S104.

Figure 10:
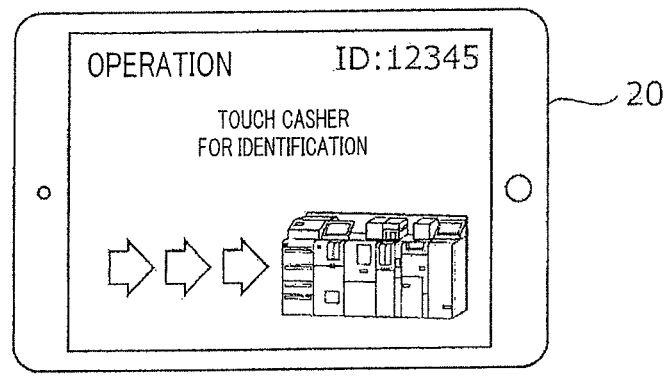
FIG. 10 illustrates a screen example displayed on the portable terminal in the moving money process.
Figure 11:
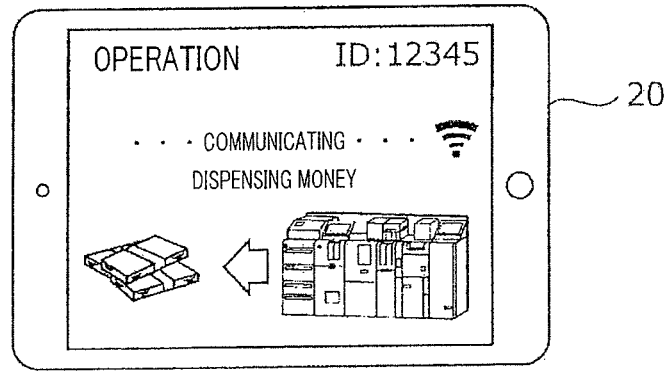
FIG. 11 illustrates a screen example displayed on the portable terminal in the moving money process.

In step S104, portable terminal 20 is brought to moving money source apparatus 10 (casher 10A in this case) and displays a screen for instruction for causing portable terminal 20 to touch casher 10A (see FIG. 10). The operator moves to casher 10A, and holds portable terminal 20 over NFC communication section 13 of casher 10A, thus starting the dispensing money process. That is, the dispensing money process is started only after the operator comes to a position where the dispensing money process is allowed (in proximity to casher 10A). Consequently, a failure where the money dispensing information is registered by a remote operation, and cash is dispensed from casher 10A even without any operator, does not occur.

When portable terminal 20 is held over casher 10A, NFC communication is established (step S105). Furthermore, Bluetooth setting information is transmitted and received through the NFC communication, and a pairing process and an identification process for starting Bluetooth communication are performed. Accordingly, the Bluetooth communication is established, and data transmission and reception are handed over to the Bluetooth communication (what is called Bluetooth handover; step S106). After the Bluetooth communication is established, the processing transitions to a process in step S107.

Until the Bluetooth communication is established by the NFC communication, portable terminal 20 is kept still in a state of facing NFC communication section 13 of casher 10A. After the Bluetooth communication is established, portable terminal 20 may be moved within a communication zone.

In step S107, portable terminal 20 transmits moving money information (moving money source apparatus information, moving money destination apparatus information, cash information, and operator information) to casher 10A. Without the operator's special operation, the moving money information is transmitted to casher 10A.

In step S108, casher 10A determines whether the process is an authentic dispensing money process or not on the basis of the received moving money information. Specifically, casher 10A determines whether the casher itself is set moving money source apparatus 10 or not on the basis of the moving money source apparatus information included in the moving money information. Casher 10A compares the operator information included in the moving money information with operator identification information 121, and determines whether the operator can use this casher or not. After the process is identified as an authentic dispensing money process, the processing transitions to a process in step S109.

If only operators permitted to perform the moving money process operation can log in to portable terminal 20 or select the moving money process in the process menu, the determination of whether the operator can use casher 10A or not can be omitted. This is also applicable to after-mentioned determination of whether the operator can use money changer 10B or not.

In step S109, casher 10A dispenses cash from money accepting and dispensing section 17 on the basis of the cash information included in the moving money information. That is, casher 10A serving as the moving money source apparatus dispenses cash, only if the machine is identified as an authentic moving money source cash processing machine on the basis of the moving money source apparatus information received from portable terminal 20. Accordingly, safety is secured in the moving money process. A screen representing that the process is in the dispensing money state is displayed on operation and display section 25 of portable terminal 20 (see FIG. 11).

After the entire set cash is dispensed from money accepting and dispensing section 17 and the dispensing money is completed, casher 10A transmits, to portable terminal 20, dispensing money completion information representing completion of the dispensing money process. The dispensing money completion information includes information representing the completion time of the dispensing money process (information on the dispensing money date and time). Portable terminal 20 registers the received dispensing money completion information as the moving money information. The Bluetooth communication between casher 10A and portable terminal 20 is disconnected.

According to the above processes, the dispensing money process in casher 10A is thus completed. The moving money information is input and the moving money information is registered in casher 10A using portable terminal 20, thereby negating the need of information input through casher 10A, which has been conventionally performed. In casher 10A, the voucher is not issued either. The moving money information is transmitted from portable terminal 20 to casher 10A through NFC communication and Bluetooth communication to start the dispensing money process, only by holding portable terminal 20 over casher 10A. Consequently, the operability is excellent. After the moving money process is completed, the processing transitions to a process in step S110.

Figure 12:
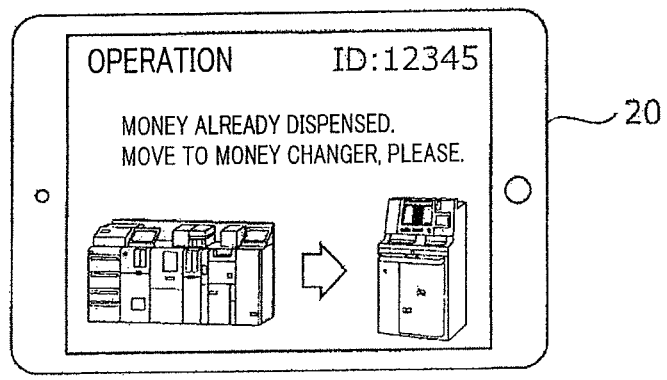
FIG. 12 illustrates a screen example displayed on the portable terminal in the moving money process.
Figure 13:
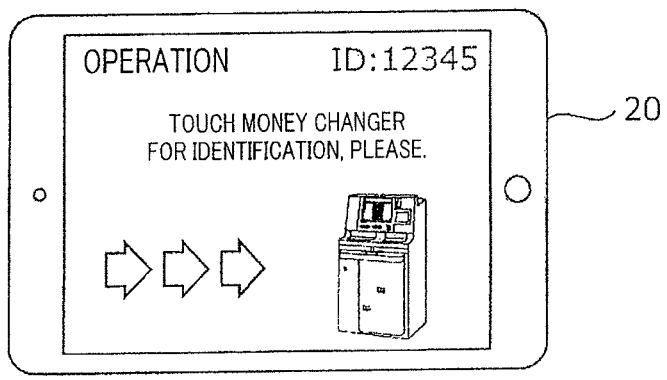
FIG. 13 illustrates a screen example displayed on the portable terminal in the moving money process.
Figure 14:
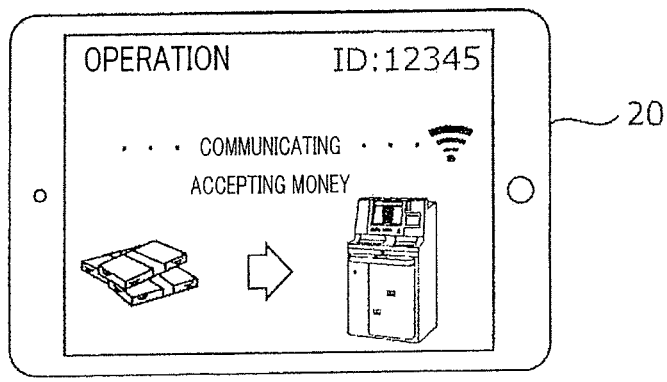
FIG. 14 illustrates a screen example displayed on the portable terminal in the moving money process.
Figure 15:
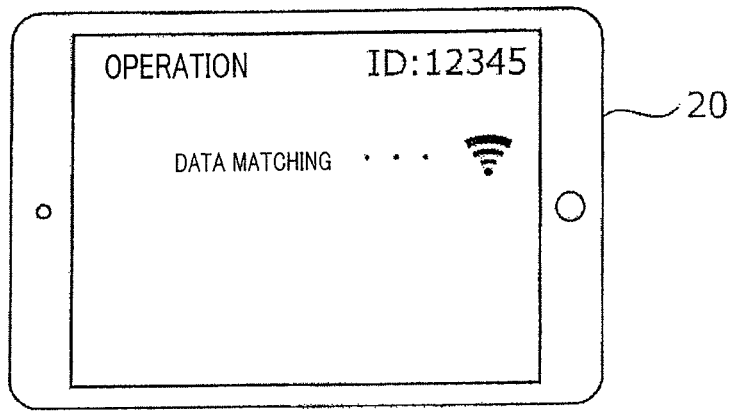
FIG. 15 illustrates a screen example displayed on the portable terminal in the moving money process.
Figure 16:
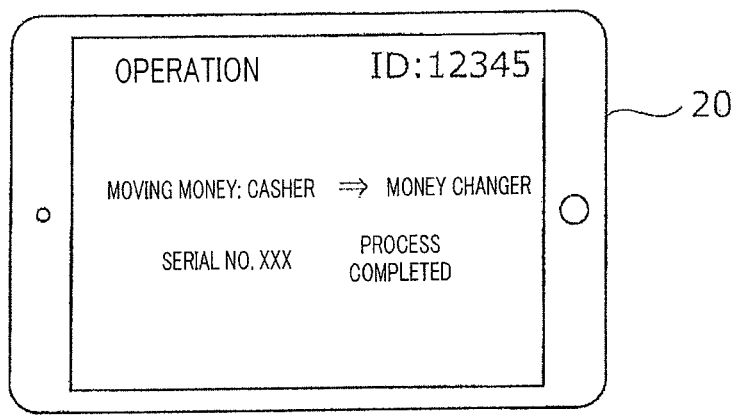
FIG. 16 illustrates a screen example displayed on the portable terminal in the moving money process.

In step S110, portable terminal 20 is brought to moving money destination apparatus 10 (money changer 10B in this case) and displays a screen for instruction for causing portable terminal 20 to touch money changer 10B (see FIGS. 12 and 13). The screens illustrated in FIGS. 12 and 13 are switched at predetermined intervals, for example. As illustrated in FIG. 12, the operator can easily check moving money destination apparatus 10. Consequently, moving money destination apparatus 10 serving as the accepting money target can be securely grasped only if a plurality of similar apparatuses, such as teller machines 10C and ATMs (not illustrated) are installed. Pursuant to the instruction, the operator moves to money changer 10B while carrying the cash having been subjected to dispensing money, and holds portable terminal 20 over NFC communication section 13 of money changer 10B, thus starting the accepting money process. That is, the accepting money process is started only after the operator comes to a position where the accepting money process is allowed (in proximity to money changer 10B). Consequently, a failure where the money accepting information is registered by a remote operation and money changer 10B comes into a standby state for accepting cash to make other processes congested, does not occur.

When portable terminal 20 is held over money changer 10B, NFC communication is established (step S111). Furthermore, Bluetooth setting information is transmitted and received through the NFC communication, and a pairing process and an identification process for starting Bluetooth communication are performed. Accordingly, the Bluetooth communication is established, and data transmission and reception arc handed over to the Bluetooth communication (step S112). After the Bluetooth communication is established, the processing transitions to a process in step S113.

In step S113, portable terminal 20 transmits moving money information (moving money source apparatus information, moving money destination apparatus information, cash information, and operator information) to money changer 10B. Without the operator's special operation, the moving money information is transmitted to money changer 10B.

In step S114, money changer 10B determines whether the process is an authentic accepting money process or not on the basis of the received moving money information. Specifically, money changer 10B determines whether this changer itself is set moving money destination apparatus 10 or not on the basis of the moving money destination apparatus information included in the moving money information. Money changer 10B compares the operator information included in the moving money information with operator identification information 121, and determines whether the operator can user this changer or not. After the process is identified as an authentic accepting money process, the processing transitions to a process in step S115.

In step S115, money changer 10B opens money accepting and dispensing section 17 to achieve a state capable of accepting cash. The operator replenishes money changer 10B with the cash having been subjected to the dispensing money from casher 10A. That is, money changer 10B serving as the moving money destination apparatus accepts cash, only if the machine is identified as an authentic moving money destination cash processing machine on the basis of the moving money destination apparatus information received from portable terminal 20. Accordingly, safety is secured in the moving money process. A screen representing that the process is in accepting money state is displayed on operation and display section 25 of portable terminal 20 (see FIG. 14). After the replenishment with cash by the operator is completed, the processing transitions to a process in step S116.

In step S116, money changer 10B counts the replenished cash for each denomination (recognition and counting), and matches the cash information included in the moving money information against a recognized and counted result on replenished cash. A screen representing that the state is in the comparing process is displayed on operation and display section 25 of portable terminal 20 (see FIG. 15), and finally a comparing result is displayed. Accordingly, the operator can easily check the comparing result, and appropriately complete the moving money process. In case the comparing result is abnormal, required measures can be immediately taken. Accordingly, the disadvantage due to abnormality in moving money can be suppressed to the minimum.

If the comparing result is normal and the accepting money process is completed, money changer 10B transmits, to portable terminal 20, accepting money completion information representing the completion of the accepting money process. The accepting money completion information includes information representing the completion time of the accepting money process (information on the accepting money date and time). Portable terminal 20 registers the received accepting money completion information as moving money information 221. A screen representing that the moving money process is completed is displayed on operation and display section 25 of portable terminal 20 (see FIG. 16). The Bluetooth communication between money changer 10B and portable terminal 20 is disconnected.

The comparing between the cash information included in the moving money information and the recognized and counted result on replenished cash may be performed in portable terminal 20. After the moving money process is completed, the login screen (see FIG. 6) or the process menu (see FIG. 7) may be displayed, for example.

Moving money information 221 registered in storage section 22 is managed by moving money history management section 214. Moving money history management section 214 displays a moving money history display screen according to the operator's predetermined operation through operation and display section 25, for example. The operator can easily check the situation of execution of the moving money process including whether there is an unprocessed moving money process or not, by viewing the moving money history display screen. As described above, the moving money information is aggregated in portable terminal 20 in cash processing system 1. Consequently, the moving money information can be managed in a centralized manner.

Portable terminal 20 may provide the moving money information for an external apparatus, such as a host computer, and casher 10A. Also in this case, the moving money information is managed in a centralized manner. Consequently, the moving money information can be easily provided.

According to the above processes, the accepting money process in money changer 10B is thus completed. The moving money information is input and the moving money information is registered in money changer 10B using portable terminal 20, thereby negating the need of information input through money changer 10B, which has been conventionally performed. The moving money information is transmitted from portable terminal 20 to money changer 10B through NFC communication and Bluetooth communication to start the accepting money process, only by holding portable terminal 20 over money changer 10B. Consequently, the operability is excellent.

As described above, cash processing system 1 includes moving money source apparatus 10 operating as a money dispenser (first cash processing machine), moving money destination apparatus 10 operating as a money acceptor (second cash processing machine), and portable terminal 20. Portable terminal 20 includes: operation and display section 25 (display) that displays the moving money process screen; operation and display section 25 (operation unit) that accepts an input of the moving money information including the cash information through the moving money process screen; and NFC communication section 23 and Bluetooth communication section 24 (communication processing section) that transmit and receive information to and from moving money source apparatus 10 and moving money destination apparatus 10. When the money dispensing information included in the moving money information is received from portable terminal 20, moving money source apparatus 10 dispenses cash based on the money dispensing information. When the money accepting information included in the moving money information is received from portable terminal 20, moving money destination apparatus 10 accepts cash based on the money accepting information.

Cash processing system 1 allows the operator to input the moving money information by a single operation through portable terminal 20 held by this operator, thereby reducing the manhours of office operations. Since the operation panel for inputting the moving money information is thus integrated, erroneous operations due to poor handling proficiency are reduced. Furthermore, even if moving money processes of dealing with identical cash processing machine 10 (e.g., casher 10A) occur at the same time, a single operator does not occupy this cash processing machine for long time for information input. Consequently, the moving money processes can be efficiently performed. Cash processing system 1 can prevent the operator's erroneous operation in the moving money process, and efficiently execute the moving money process.

The need to issue the moving money voucher in moving money source apparatus 10 is negated. Consequently, the operation becomes further paperless, and the cost required for the moving money process can be reduced. Furthermore, portable terminal 20 can check the situation of the moving money process, as needed. Consequently, the usability is excellent. Even when the moving money process is congested at the middle of the process, the process to be executed can be easily checked. Consequently, the moving money process can be securely completed.

The invention made by the present inventors has been specifically described above on the basis of the embodiments. However, the present invention is not limited to the embodiments described above, and can be changed in a range without departing from the gist thereof.

In the embodiment, the information is transmitted and received using NFC communication and Bluetooth communication during dispensing money and accepting money. However, the present invention is not limited thereto. For example, only one of NFC communication and Bluetooth communication may be used. Any of other wireless communication standards (e.g., infrared communication, ZigBee) may be used. What is called Wi-Fi handover, which hands over the NFC communication to a wireless LAN, may be used. Further alternatively, wireless communication using an USB cable may be used.

In case the Bluetooth communication between cooperating apparatus 10 and portable terminal 20 is disconnected in the middle of the dispensing money process or the accepting money process (the period during movement is excluded), it is preferred that the details of the moving money process that is in process be displayed on operation and display section 25 and instruction for touching portable terminal 20 again be issued.

When the dispensing money process is completed in moving money source apparatus 10 (e.g., casher 10A), the login state of portable terminal 20 may be temporarily canceled (logoff) and login may be made again for the accepting money process at the moving money destination apparatus (e.g., money changer 10B). In this case, when the operator logs in again and selects the moving money process in the process menu, the details of the moving money process that is in process are displayed. Although the times of operating portable terminal 20 by the operator increase, the operation is accompanied by no erroneous operation. Consequently, this mode is helpful for improving the safety.

It should be regarded that the embodiments disclosed this time are examples in all respects and are not limiting. The scope of the present invention is represented by the claims instead of the above description. The scope is intended to encompass all modifications in view equivalent to the claims and in the range thereof.

The disclosures of the description, drawings and abstract included in Japanese Patent Application No. 2016-130500 filed in Jun. 30, 2016 are incorporated by reference in this application.

REFERENCE SIGNS LIST

1 Cash processing system
10 Cash processing machine, Moving money source apparatus, Moving money destination apparatus, Cooperating apparatus
11 Control section
12 Storage section
13 NFC communication section
14 Bluetooth communication section
15 Operation unit
16 Display
17 Money accepting and dispensing section
18 Recognition and counting section
20 Portable terminal
21 Control section (moving money instruction section)
22 Storage section
23 NFC communication section (communication processing section)
24 Bluetooth communication section (communication processing section)
25 Operation and display section (operation unit, and display)

The invention claimed is:

1. A cash processing system comprising a first cash processing machine operating as a money dispenser, a second cash processing machine operating as a money acceptor, and a tablet computer,
the first cash processing machine is a money dispenser comprising a communication section configured to perform wireless communication, an outlet, and a controller,
the second cash processing machine is a money acceptor comprising a communication section configured to perform wireless communication, an inlet, and a controller,
wherein the tablet computer comprises:
an operation acceptor operable to receive an input of moving money information including cash information;
a first communication section directly transmitting and receiving information to and from the communication section of the first cash processing machine through a first wireless communication being proximity wireless communication for performing a first pairing between the tablet computer and the first cash processing machine, the first communication section directly transmitting and receiving information to and from the communication section of the second cash processing machine through the first wireless communication for performing a second pairing between the tablet computer and the second cash processing machine,
a second communication section directly transmitting money dispensing information included in the moving money information to the communication section of the first cash processing machine through a second wireless communication having a wider communication range than the proximity wireless communication after the first pairing is performed, the second communication section directly transmitting money accepting information included in the moving money information to the communication section of the second cash processing machine through the second wireless communication after the second pairing is performed
wherein the first cash processing machine dispenses cash corresponding to the money dispensing information via the outlet in response to receiving of the money dispensing information from the second communication section of the tablet computer by the communication section of the first cash processing machine, and
wherein the second cash processing machine accepts cash corresponding to the money accepting information via the inlet in response to receiving of the money accepting information from the second communication section of the tablet computer by the communication section of the second cash processing machine.

2. The cash processing system according to claim 1,
wherein the tablet computer comprises a display that displays a moving money process screen, and
the operation acceptor accepts the input of the moving money information through the moving money process screen.

3. The cash processing system according to claim 2,
wherein the second cash processing machine comprises a counting section operable to count the accepted cash, and
the tablet computer displays, on the display, a result of comparing a counted result by the counting section with the cash information.

4. The cash processing system according to claim 1, wherein the first communication section is operable to perform identification between the tablet computer and the first cash processing machine and perform identification between the tablet computer and the second cash processing machine through the first wireless communication.

5. The cash processing system according to claim 1,
wherein the money dispensing information includes moving money source apparatus information representing a cash processing machine serving as a moving money source,
the money accepting information includes moving money destination apparatus information representing a cash processing machine serving as a moving money destination, the first cash processing machine dispenses cash, when the first cash processing machine is identified as an authentic moving money source cash processing machine based on the moving money source apparatus information received from the tablet computer, and the second cash processing machine accepts cash, when the second cash processing machine is identified as an authentic moving money destination cash processing machine based on the moving money destination apparatus information received from the tablet computer.

6. The cash processing system according to claim 1, wherein the tablet computer comprises an identification section configured to perform a process of identifying an operator, based on recognition information on the operator having already been registered and recognition information input through the operation unit, and when the operator is identified as an authentic operator by the identification section, the operation unit accepts an input of the moving money information.

7. The cash processing system according to claim 1, wherein the tablet computer comprises a management section operable to manage a history of the moving money process.

8. The cash processing system according to claim 1, wherein the tablet computer is configured to display a first screen or a second screen according to progress of moving money process based on the moving money information, the first screen indicating an instruction to move to the first cash processing machine, the second screen indicating an instruction to move to the second cash processing machine.

9. The cash processing system according to claim 8, wherein the tablet computer is configured to display the first screen after the operation acceptor operable receives the moving money information, and the tablet computer is configured to display the second screen upon completion of dispensing of the cash based on the money dispensing information by the first cash processing machine.

10. A cash processing method in a cash processing system comprising a first cash processing machine operating as a money dispenser, a second cash processing machine operating as a money acceptor, and a tablet computer, the first cash processing machine being a money dispenser comprising a communication section configured to perform wireless communication, an outlet, and a controller, the second cash processing machine being a money acceptor comprising a communication section configured to perform wireless communication, an inlet, and a controller, the cash processing method comprising:

accepting, by the tablet computer, an input of moving money information including cash information;

transmitting and receiving, by the tablet computer, directly, to and from the communication section of the first cash processing machine through a first wireless communication being proximity wireless communication for performing a first pairing between the tablet computer and the first cash processing machine;

transmitting, by the tablet computer, directly, money dispensing information included in the moving money information to the communication section of the first cash processing machine through a second wireless communication having a wider communication range than the proximity wireless communication after the first pairing is performed;

dispensing, by the first cash processing machine, cash corresponding to the money dispensing information via the outlet in response to receiving of the money dispensing information from the second communication section of the tablet computer by the communication section of the first cash processing machine;

transmitting and receiving, by the tablet computer, directly, to and from the communication section of the second cash processing machine through the first wireless communication for performing a second pairing between the tablet computer and the second cash processing machine;

transmitting, by the tablet computer, directly, money accepting information included in the moving money information to the communication section of the second cash processing machine through the second wireless communication after the second pairing is performed; and accepting, by the second cash processing machine, cash corresponding to the money accepting information via the inlet in response to receiving of the money accepting information from the second communication section of the tablet computer by the communication section of the second cash processing machine.

11. A tablet computer for use when a moving money process is performed in a cash processing system, the cash processing system including a first cash processing machine operating as a money dispenser, and a second cash processing machine operating as a money acceptor, the first cash processing machine being a money dispenser comprising a communication section configured to perform wireless communication, an outlet, and a controller, the second cash processing machine being a money acceptor comprising a communication section configured to perform wireless communication, an inlet, and a controller, the tablet computer comprising:

an operation acceptor that accepts an input of moving money information including cash information;

a first communication section directly transmitting and receiving information to and from the communication section of the first cash processing machine through a first wireless communication being proximity wireless communication for performing a first pairing between the tablet computer and the first cash processing machine, the first communication section directly transmitting and receiving information to and from the communication section of the second cash processing machine through the first wireless communication for performing a second pairing between the tablet computer and the second cash processing machine;

a second communication section performing a second wireless communication having a wider communication range than the proximity wireless communication; and a moving money instruction section directly transmitting money dispensing information included in the moving money information to the communication section of the first cash processing machine through the second communication section to instruct the first cash processing machine to dispense cash corresponding to the money dispensing information after the first pairing is performed, and the moving money instruction section directly transmitting money accepting information included in the moving money information to the communication section of the second cash processing machine through the second communication section to instruct the second cash processing machine to accept cash corresponding to the money accepting information after the second pairing is performed.

\* \* \* \* \*